(12) United States Patent
Wang

(10) Patent No.: US 11,984,135 B2
(45) Date of Patent: May 14, 2024

(54) SYSTEM AND METHOD FOR OFFLINE EMBEDDED ABNORMAL SOUND FAULT DETECTION

(71) Applicant: Espressif Systems (Shanghai) Co., Ltd., Shanghai (CN)

(72) Inventor: Wangwang Wang, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 182 days.

(21) Appl. No.: 17/189,783

(22) Filed: Mar. 2, 2021

(65) Prior Publication Data

US 2021/0272580 A1 Sep. 2, 2021

(30) Foreign Application Priority Data

Mar. 2, 2020 (CN) .......................... 202010135741.6

(51) Int. Cl.
*G10L 25/51* (2013.01)
*G06F 18/241* (2023.01)
(Continued)

(52) U.S. Cl.
CPC ............ *G10L 25/51* (2013.01); *G06F 18/241* (2023.01); *G06N 3/044* (2023.01); *G06N 3/045* (2023.01); *G10L 25/18* (2013.01); *G10L 25/30* (2013.01)

(58) Field of Classification Search
CPC ......... G10L 25/51; G10L 25/18; G10L 25/30; G06K 9/6268; G06N 3/0445; G06N 3/0454
See application file for complete search history.

(56) References Cited

U.S. PATENT DOCUMENTS 9,892,744 B1 * 2/2018 Salonidis ............. G05B 19/406
10,475,468 B1 * 11/2019 Yelchuru ............ G05B 23/0235
(Continued)

OTHER PUBLICATIONS

Kiranyaz, Serkan, et al. "Real-time pcg anomaly detection by adaptive 1d convolutional neural networks." (2019) (Year: 2019).*
(Continued)

*Primary Examiner* — Bhavesh M Mehta
*Assistant Examiner* — Nandini Subramani
(74) *Attorney, Agent, or Firm* — Reinhart Boerner Van Deuren P.C.

(57) ABSTRACT

System and method for offline embedded abnormal sound fault detection are disclosed, the system comprising a sound acquisition module, a sound audio feature extraction module, and a neural network module. The sound audio feature extraction module uses fast Fourier transform to process sample data in a frequency domain, and then inputs the sample data to the neural network module to complete anomaly classification. The neural network module comprises at least one CNN feature extraction layer, a long short-term memory (LSTM) layer, at least one fully connected and at least one classification layer, and a trigger decision layer. The number of network layers of the at least one CNN feature extraction layer is dynamically adjustable, a network structure of the at least one fully connected layer and the at least one classification layer is dynamically variable, and the trigger decision layer is configured to eliminate generalization errors generated by a neural network. The present disclosure works in an offline environment, has less dependence on the network, strong performance and reliable operation, and can adapt to changing working environment for anomaly diagnosis.

12 Claims, 2 Drawing Sheets

(51) Int. Cl.
  *G06N 3/044*  (2023.01)
  *G06N 3/045*  (2023.01)
  *G10L 25/18*  (2013.01)
  *G10L 25/30*  (2013.01)

(56) References Cited

U.S. PATENT DOCUMENTS

| | | | |
|---|---|---|---|
| 2018/0096243 A1* | 4/2018 | Patil | G06N 3/084 |
| 2019/0376840 A1* | 12/2019 | Koizumi | G01H 17/00 |
| 2020/0046244 A1* | 2/2020 | Alam | G06N 3/045 |
| 2020/0293653 A1* | 9/2020 | Huang | G06N 3/08 |
| 2021/0005067 A1* | 1/2021 | Salekin | G10L 25/78 |
| 2021/0049452 A1* | 2/2021 | Fan | G06N 3/049 |
| 2021/0256991 A1* | 8/2021 | Jun | G10L 25/30 |

OTHER PUBLICATIONS

Yang, L., Zhang, Z., & Hu, J. (Dec. 2019). Research on Acoustic Scene Classification Based on Multiple Mixed Convolutional Neural Networks. In 2019 IEEE International Conference on Signal, Information and Data Processing (ICSIDP) (pp. 1-5). IEEE. (Year: 2019).*

* cited by examiner

SYSTEM AND METHOD FOR OFFLINE EMBEDDED ABNORMAL SOUND FAULT DETECTION

TECHNICAL FIELD

The present disclosure relates to the field of embedded equipment, in particular to systems and methods for offline embedded abnormal sound fault detection.

BACKGROUND ART

Sound is a convenient, effective, and quick way to convey information. At present, anomaly detection of vehicles, fault detection of mechanical equipment such as compressors and motors, detection of abnormal sound in a room, and detection of children's cry are mainly based on human judgment and rely too much on people's subjective experience, which may lead to large error and high cost in locating the anomalies.

In recent years, there emerge some abnormal sound detection methods based on deep learning. These methods can show good practical application effect but still have some defects:

1. complicated systems are required, which have heavy computing burden and dependence on complicated computing unit or even graphics processing unit (GPU), resulting in difficulties and high cost in deployment of fault detection systems for air conditioners, compressors and other equipment; and
2. a large scale fault detection system needs to be deployed on the server, and working data will be transmitted to the server by connecting the equipment to be detected to a network, and then after detection on the serve, the detection result has to be transmitted to the equipment via the network. There are at least several problems in doing so:

due to heavy dependence on the network environment, the conventional fault detection systems may not work when the network fails;

due to large span in working sound frequency domain of the air conditioners and compressors to be detected, 48 KHz is needed as a sound sampling frequency, so a large amount of data needs to be transmitted, which puts great pressure on the network; and frame drop is prone to occur when real-time audio is transmitted over the network. When the frame drop occurs in an audio stream, spectrum features thereof may change accordingly, resulting in failure of the fault detection.

SUMMARY OF THE INVENTION

The present disclosure provides systems and methods for offline embedded abnormal sound fault detection, which may solve at least some of the above problems existing in the prior art, reduce dependence on the network, and improve reliability of abnormal sound detection.

Accordingly, the technical solution adopted by the present disclosure is to provide a system for offline embedded abnormal sound fault detection comprising an embedded end system. The embedded end system comprises a sound acquisition module, a sound audio feature extraction module, and a neural network module.

The sound acquisition module converts sound from a sound source to be detected into an audio digital signal, and then transmits the audio digital signal to the sound audio feature extraction module. The sound audio feature extraction module processes the audio digital signal in a frequency domain to obtain an audio frequency sample as an input of the neural network module.

The neural network module consists of at least one CNN feature extraction layer and at least one fully connected layer and at least one classification layer. The number of network layers of the at least one CNN feature extraction layer is dynamically adjustable. After the at least one CNN feature extraction layer performs feature extraction on the audio frequency sample, the at least one fully connected layer and the at least one classification layer select one of a plurality of anomaly types as an anomaly detection result to complete anomaly classification.

Working parameters of the neural network module are determined by an anomaly detection model. The number of the anomaly types is determined by the anomaly detection model. A network structure of the at least one fully connected layer and the at least one classification layer is determined according to the number of the anomaly types and is dynamically variable, and the anomaly types to be outputted comprise N types of anomalies, unrecognized anomaly, and no anomaly.

Further, the neural network module further comprises a long short-term memory (LSTM) layer. The LSTM layer processes output of the at least one CNN feature extraction layer, performs screening of time dimension information, and then sends output to the at least one fully connected layer and the at least one classification layer.

Further, the neural network module further comprises a trigger decision layer; and the trigger decision layer performs final classification for the output of the at least one fully connected layer and the at least one classification layer to eliminate generalization errors.

Further, a workflow of the trigger decision layer comprises:

step 101) obtaining an anomaly detection result of the at least one fully connected layer and the at least one classification layer; proceeding to step 102 if the anomaly detection result is one of the N types of anomalies or the unrecognized anomaly, otherwise proceeding to step 105;

step 102) incrementing a counter and proceeding to step 103;

step 103) if, in L frames, a number of times that the anomaly detection result is a same anomaly is greater than or equal to a threshold, proceeding to step 104, otherwise proceeding to step 105;

step 104) resetting the counter, reporting an anomaly, and ending the workflow; and step 105) resetting the counter, and ending the workflow without reporting an anomaly.

Further, the input of the neural network module is sample information formed by splicing audio frequency samples of a current frame and consecutive N frames prior to the current frame.

Further, the sound acquisition module uses a digital microphone as an acquisition device.

Further, an audio sampling frequency of the digital microphone is 48 KHz.

Further, the sound audio feature extraction module extracts the audio frequency sample by fast Fourier transform.

Further, the fast Fourier transform is 512-point fast Fourier transform.

The technical solution adopted by the present disclosure further comprises a method for anomaly detection using the system for offline embedded abnormal sound fault detection, the method comprising the following steps of:

- step 201) using the sound acquisition module to collect the sound from the sound source to be detected to obtain the audio digital signal;
- step 202) using the sound audio feature extraction module to process the audio digital signal in the frequency domain to obtain the audio frequency sample of the audio digital signal;
- step 203.1) using the at least one CNN feature extraction layer to perform convolution on the audio frequency sample to complete the feature extraction;
- step 203.2) using the long short-term memory (LSTM) layer to screen time dimension information of the feature extracted;
- step 203.3) using the at least one fully connected layer and the at least one classification layer to complete anomaly classification; and
- step 204) using the trigger decision layer to perform final classification, eliminating generalization errors, and obtaining an anomaly detection result.

Owing to the above technical features, the present disclosure has the following advantages:

1) the present disclosure works in an offline environment, thus having less dependence on the network, and providing strong performance and reliable operation;
2) by adding the LSTM layer, the present disclosure selectively retains or discards historical information on a time axis, so that the historical information may be added to judgment basis, thereby improving accuracy of the anomaly detection;
3) the trigger decision layer is introduced to the present disclosure to process whether an output result of Softmax is an error result, so as to further improve the accuracy of the anomaly detection;
4) in the present disclosure, the digital microphone is used as the sound acquisition device, which avoids disadvantages of poor performance stability and poor consistency of conventional electret microphones and avoids the need to cooperate with an ADC (Analog to Digital Converter) at a later stage to convert analog signals into processable digital signals, which is required by using an analog microphone, thus simplifying system design and reducing cost;
5) in the present disclosure, 48 KHz is used as the audio sampling frequency, which avoids loss of part of sound characteristic frequency due to 8 KHz or 16 KHz sampling that results in poor effect of the anomaly detection and even failure to detect some anomalies; and
6) in the present disclosure, an FFT algorithm is used instead of an MFCC algorithm, which retains frequency domain characteristics of abnormal sound to the greatest extent.

Because a Mel filter used in the MFCC algorithm is optimized for human hearing, that is, when two sounds with different loudness act on human ears, presence of the frequency component with higher loudness will affect perception of the frequency component with lower loudness, rendering the frequency component with lower loudness imperceptible. However, the source of sound in the anomaly detection task in the context of the present disclosure is not human voice, which does not conform to pronunciation characteristics of human voice and auditory characteristics of human ears.

REFERENCE NUMERALS IN THE DRAWINGS

1—audio to be detected; 2—sound acquisition module; 3—sound audio feature extraction module; 4—CNN feature extraction layer; 5—long short-term memory (LSTM) layer; 6—at least one fully connected layer and at least one classification layer; 7—trigger decision layer; and 8—embedded anomaly fault detection system.

DETAILED DESCRIPTION OF THE PREFERRED EMBODIMENTS

The present disclosure will be further described below with reference to specific embodiments. It should be appreciated that these embodiments are provided for the purpose of illustrating the present disclosure only and are not intended to limit the scope thereof. In addition, it should be understood that after reading the contents taught by the present disclosure, those skilled in the art can make various changes and modifications to the present disclosure, and the equivalent forms shall also similarly fall within the scope defined by the claims of the present disclosure.

Figure 1:
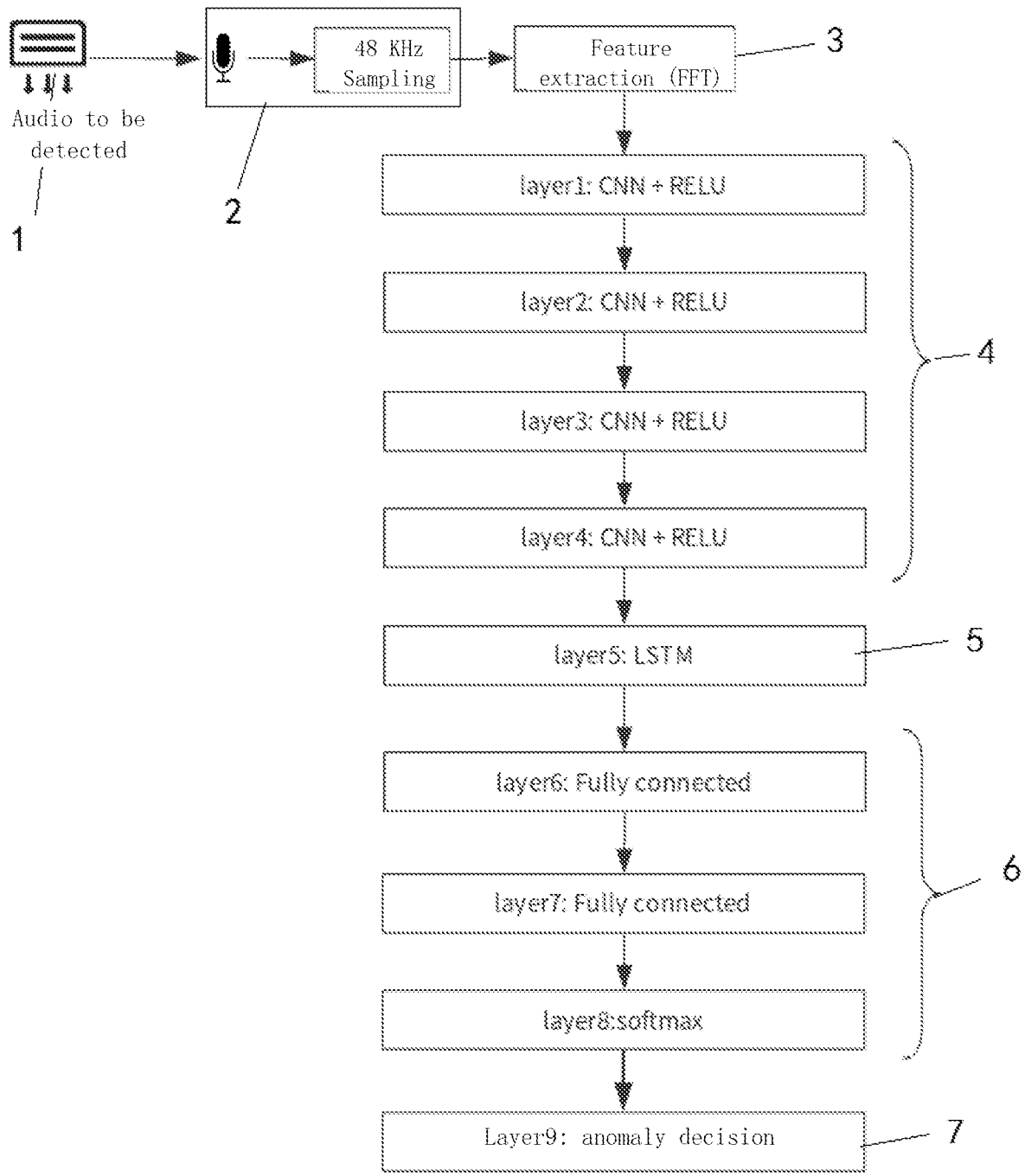
FIG. 1 is a structural diagram of an embedded end system of an embodiment of the present disclosure.

Refer to FIG. 1, in a system for offline embedded abnormal sound fault detection of the present embodiment, an embedded end system may be arranged in or near a sound source to be detected. The system for abnormal sound fault detection may be applied to a variety of scenarios, such as application to the industrial field for mechanical equipment fault detection, and application to determination of infant's cry to judge health status of infants.

The embedded end system comprises a sound acquisition module 2, a sound audio feature extraction module 3, and a neural network module.

The sound acquisition module 2 is configured to convert audio to be detected 1 from a sound source to be detected into an audio digital signal. Specifically, the sound source to be detected may be a equipment to be detected, or a person or other audible object, and then the audio digital signal is transmitted to the sound audio feature extraction module 3. The sound acquisition module 2 selects a stable digital microphone with the least number of system components as an acquisition microphone, and 48 KHz is used as an audio sampling frequency.

The sound audio feature extraction module 3 uses Fourier transform to extract features of the audio, and processes the audio digital signal in a frequency domain to obtain an audio frequency sample of the audio digital signal as an input of the neural network module. In the sampling process, audio data of 10.67 ms is collected from a mono channel at 48 KHz and 16 bit each time, namely 512 audio points. Then the 512-point sound signal x is subject to fast Fourier transform to obtain 257 eigenvalue points X.

$$x=(x_1, x_2, \ldots, x_t) t=512$$

$$X=FFT(x)$$

Working parameters of the neural network module may be determined by an anomaly detection model. The neural network module may consist of at least one CNN feature extraction layers 4, a long short-term memory (LSTM) layer 5, at least one fully connected layer and at least one classification layer 6, and a trigger decision layer 7. The specific number of network layers may be flexibly increased or appropriately reduced according to actual remaining resources of the anomaly diagnosis system. There are four CNN feature extraction layers 4 in the present embodiment (layer 1 to layer 4) for feature extraction of the audio frequency sample. Before entering the layer 1, the current frame X and 10 frames prior to the current frame $X_1$, $X_2, \ldots, X_{10}$ are spliced to obtain a feature matrix $x_1$ with historical information on a time axis, and the size of $X_1$ is (11*257). $X_1$ is successively sent to the layer 1 to layer 4 for feature extraction to finally obtain a convolution layer output result $X_o$ with a size of (30*400).

The LSTM layer 5 is layer 5, which receives the $X_o$ as an input, and screens time dimension information. A forget gate, an output gate and an input gate in the LSTM layer 5 are used to determine historical information on which time dimension is to be discarded or retained. In this way, the information on a previous time dimension will be taken into account in calculation of each frame, that is, whether the current frame length is long enough may be ignored. This not only solves the problem of too much computation and resource consumption resulting from a too long frame length, but also solves the problem of abnormal sound detection for longer and extended abnormal periods, so as to extract the dependence between incoming features in time series. Because abnormal audio usually has a certain periodical relationship, it may be difficult to extract complete abnormal audio feature information from just a few frames of audio. Therefore, abnormal feature information on the time dimension may be well taken into account by using the LSTM layer 5, and so long-term dependence problem of RNN may be solved, as compared with using RNN. After passing through the LSTM layer 5, an output $X_{OR}$ is OR generated with a size of (30*400).

The at least one fully connected layer and the at least one classification layer 6 are of a three-layer structure (layer 6 to layer 8), and include fully connected layers 6 and 7 and a Softmax classification layer 8, respectively. The output $X_{OR}$ of the LSTM layer 5 is used as the input of the at least one fully connected layer and at least one classification layer 6. Assuming that there are n types of anomalies, the value of n may be changed according to the abnormal sound detection model. If the abnormal sound detection model is updated, the value of n may also change accordingly. The final output result has a size of (1*(n+2)), that is, there are N types of anomalies, unrecognized anomaly, and no anomaly (N+2 anomaly types) from the classification. After passing through the Softmax layer, one of the anomaly types may be selected as the abnormal sound detection result to complete the abnormal sound classification of the audio frequency sample.

In view of generalization errors of neural network models, the output result after the Softmax layer may often have certain errors. Therefore, a trigger decision layer 7 is introduced after the Softmax layer for final classification.

Figure 2:
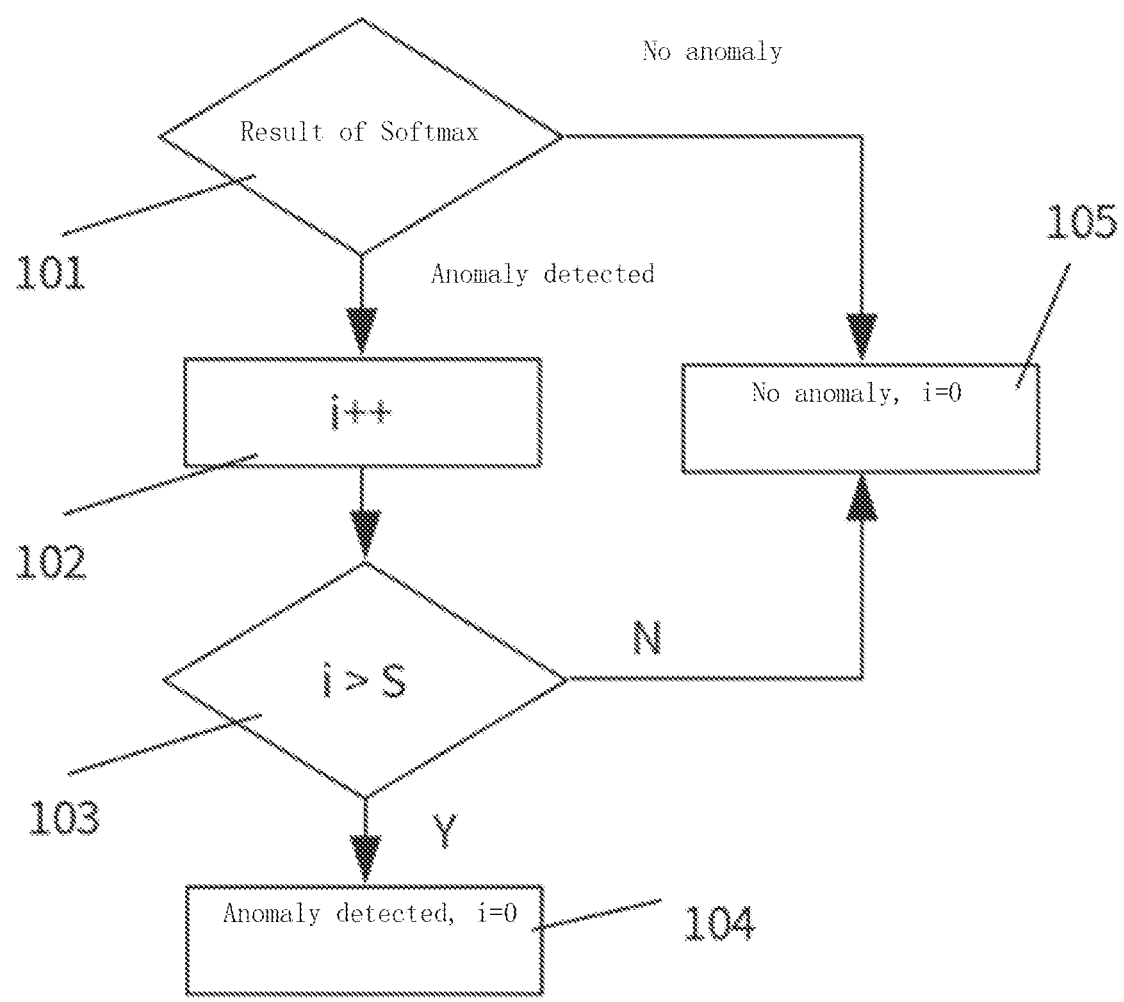
FIG. 2 is a workflow diagram of a trigger decision layer of an embodiment of the present disclosure.

Referring to FIG. 2, a workflow of the trigger decision layer of the system and method for offline embedded abnormal sound fault detection in the present embodiment comprises:

step 101) obtaining an abnormal sound detection result of the Softmax layer; proceeding to step 102 if the abnormal sound detection result is one of the N types of anomalies or the unrecognized anomaly, otherwise proceeding to step 105;

step 102) incrementing a counter and proceeding to step 103;

step 103) if, in a specified number of frames L (e.g., L may be 50-500 frames), a number of times that the abnormal sound detection result is a same anomaly is greater than or equal to a threshold, proceeding to step 104, otherwise proceeding to step 105;

step 104) resetting the counter, reporting an anomaly, and ending the workflow; and step 105) resetting the counter, and ending the workflow without reporting an anomaly.

The present disclosure further comprises a method for anomaly detection using the system for offline embedded abnormal sound fault detection, and the method comprises the following steps of:

step 201) using the sound acquisition module to collect the sound from the sound source to be detected to obtain the audio digital signal;

step 202) using the sound audio feature extraction module to process the audio digital signal in the frequency domain to obtain the audio frequency sample of the audio digital signal;

step 203.1) using the at least one CNN feature extraction layer to perform convolution on the audio frequency sample to complete the feature extraction;

step 203.2) using the long short-term memory (LSTM) layer to screen time dimension information of the feature extracted;

step 203.3) using the at least one fully connected layer and at least one classification layer to complete anomaly classification; and step 204) using the trigger decision layer to perform final classification, eliminating generalization errors, and obtaining an abnormal sound detection result.

The above description has described preferred embodiments of the present disclosure only, and therefore does not limit the scope of the present disclosure. All equivalent structures or equivalent process changes made to the present disclosure in view of the specification and drawings of the present disclosure, or direct or indirect application to other related technical fields, shall be similarly included within the scope of protection of the present disclosure.

The invention claimed is:

1. A system for offline embedded abnormal sound fault detection, comprising an embedded end system, wherein the embedded end system comprising a sound acquisition module, a sound audio feature extraction module, and a neural network module;

the sound acquisition module converting sound from a sound source to be detected into an audio digital signal, and then transmitting the audio digital signal to the sound audio feature extraction module; the sound audio feature extraction module processing the audio digital signal in a frequency domain to obtain an audio frequency sample as an input of the neural network module;

the neural network module consisting of at least one CNN feature extraction layer, a long short-term memory (LSTM) layer and at least one fully connected layer and at least one classification layer connected in series; the number of network layers of the at least one CNN feature extraction layer being dynamically adjustable; after the at least one CNN feature extraction layer performs feature extraction on the audio frequency sample and outputs a convolution layer output result, the LSTM layer directly processing output of the at least one CNN feature extraction layer, performing screening of time dimension information, and sending output of the LSTM layer to the at least one fully connected layer and the at least one classification layer, and then; the at least one fully connected layer and the at least one classification layer selecting one of a plurality of anomaly types as an anomaly detection result to complete anomaly classification;

working parameters of the neural network module being determined by an abnormal sound detection model; the number of the anomaly types being determined by the abnormal sound detection model; and a network structure of the at least one fully connected layer and the at least one classification layer being determined according to the number of the anomaly types and being dynamically variable, and the anomaly types to be outputted comprising N types of anomalies, unrecognized anomaly, and no anomaly wherein the neural network module further comprises a trigger decision layer; and the trigger decision layer performs final classification for the output of the at least one fully connected layer and the at least one classification layer to eliminate generalization errors.

2. The system for offline embedded abnormal sound fault detection according to claim 1, wherein a workflow of the trigger decision layer comprises:

step (101) obtaining an abnormal sound detection result of the at least one fully connected layer and the at least one classification layer; proceeding to step (102) if the abnormal sound detection result is one of the N types of anomalies or the unrecognized anomaly, otherwise proceeding to step (105);

step (102) incrementing a counter and proceeding to step (103);

step (103) if, in L frames, a number of times that the abnormal sound detection result is a same anomaly is greater than or equal to a threshold, proceeding to step (104), otherwise proceeding to step (105);

step (104) resetting the counter, reporting an anomaly, and ending the workflow;

and step (105) resetting the counter, and ending the workflow without reporting an anomaly.

3. The system for offline embedded abnormal sound fault detection according to claim 1, wherein the input of the neural network module is sample information formed by splicing audio frequency samples of a current frame and consecutive N frames prior to the current frame.

4. The system for offline embedded abnormal sound fault detection according to claim 3, wherein the LSTM layer comprises a forget gate, an output gate and an input gate that are configured to determine historical information on which time dimension is to be discarded or retained.

5. The system for offline embedded abnormal sound fault detection according to claim 3, wherein the sample information is a feature matrix with historical information on a time axis.

6. The system for offline embedded abnormal sound fault detection according to claim 1, wherein the sound acquisition module uses a digital microphone as an acquisition device.

7. The system for offline embedded abnormal sound fault detection according to claim 6, wherein an audio sampling frequency of the digital microphone is 48 KHz.

8. The system for offline embedded abnormal sound fault detection according to claim 1, wherein the sound audio feature extraction module extracts the audio frequency sample by fast Fourier transform.

9. The system for offline embedded abnormal sound fault detection according to claim 8, wherein the fast Fourier transform is 512-point fast Fourier transform.

10. A method for anomaly detection using the system for offline embedded abnormal sound fault detection according to claim 3, comprising the following steps of:

step (201) using the sound acquisition module to collect the sound from the sound source to be detected to obtain the audio digital signal;

step (202) using the sound audio feature extraction module to process the audio digital signal in the frequency domain to obtain the audio frequency sample of the audio digital signal;

step (203.1) using the at least one CNN feature extraction layer to perform convolution on the audio frequency sample to complete the feature extraction;

step (203.2) using the LSTM layer to screen time dimension information of the feature extracted;

step (203.3) using the at least one fully connected layer and the at least one classification layer to complete anomaly classification; and step (204) using the trigger decision layer to perform final classification, eliminating generalization errors, and obtaining an anomaly detection result.

11. The system for offline embedded abnormal sound fault detection according to claim 1, wherein the LSTM layer is configured to receive the convolution layer output result as an input, screen time dimension information, and take account of abnormal feature information on the time dimension.

12. The system for offline embedded abnormal sound fault detection according to claim 1, the number of the anomaly types is dynamically variable according to the abnormal sound detection model, and the number of the anomaly types changes in response to the abnormal sound detection model being updated.

* * * * *

UNITED STATES PATENT AND TRADEMARK OFFICE
CERTIFICATE OF CORRECTION

PATENT NO. : 11,984,135 B2
APPLICATION NO. : 17/189783
DATED : May 14, 2024
INVENTOR(S) : Wangwang Wang It is certified that error appears in the above-identified patent and that said Letters Patent is hereby corrected as shown below:

In the Claims

Column 8 Claim 10, Line 15 reads:
"A method for anomaly detection using the system for offline embedded abnormal sound fault detection according to claim 3, comprising the following steps of:"

Should read:
--A method for anomaly detection using the system for offline embedded abnormal sound fault detection according to claim 1, comprising the following steps of:--

Signed and Sealed this
Twenty-seventh Day of August, 2024

Katherine Kelly Vidal
*Director of the United States Patent and Trademark Office*